(12) United States Patent
Van Der Zee

(10) Patent No.: US 9,358,996 B2
(45) Date of Patent: Jun. 7, 2016

(54) BLADE CART FOR A WIND TURBINE BLADE

(71) Applicant: LM WP PATENT HOLDING, Kolding (DK)

(72) Inventor: Jacobus Van Der Zee, Kolding (DK)

(73) Assignee: LM WP PATENT HOLDING A/S, Kolding (DK)

( * ) Notice: Subject to any disclaimer, the term of this patent is extended or adjusted under 35 U.S.C. 154(b) by 25 days.

(21) Appl. No.: 14/366,087

(22) PCT Filed: Dec. 18, 2012

(86) PCT No.: PCT/EP2012/075971
§ 371 (c)(1),
(2) Date: Jun. 17, 2014

(87) PCT Pub. No.: WO2013/092597
PCT Pub. Date: Jun. 27, 2013

(65) Prior Publication Data
US 2014/0361127 A1    Dec. 11, 2014

(30) Foreign Application Priority Data

Dec. 19, 2011    (EP) ...................................... 1121760

(51) Int. Cl.
*B62B 3/10*    (2006.01)
*B62B 3/04*    (2006.01)
(Continued)

(52) U.S. Cl.
CPC ... *B62B 3/10* (2013.01); *B62B 3/04* (2013.01); *B65D 85/68* (2013.01); *B66C 1/108* (2013.01); *F03D 1/005* (2013.01); *B65D 2585/6897* (2013.01); *F05B 2230/61* (2013.01); *F05B 2260/30* (2013.01); *F05B 2260/301* (2013.01); *Y02E 10/72* (2013.01); *Y02P 70/523* (2015.11)

(58) Field of Classification Search
CPC ............. B60P 3/40; B60P 3/41; B66C 1/108; B65D 85/65; B65D 2585/6897; F03D 1/00; F03D 1/003; F05B 2230/61; F05B 2230/60; F05B 2230/80; F05B 2260/30; F05B 2260/301; Y02E 10/72
USPC ........... 248/125.7, 121, 129; 410/45, 44, 120; 280/400, 404, 79.3
See application file for complete search history.

(56) References Cited

U.S. PATENT DOCUMENTS 4,365,919 A * 12/1982 Mehki ...................... B60P 7/12
                                                        410/120
7,303,365 B2    12/2007 Wobben
(Continued)

FOREIGN PATENT DOCUMENTS

DE    10211357 A1    9/2002
EP    1956234 A2    8/2008
(Continued)

*Primary Examiner* — Anita M King
(74) *Attorney, Agent, or Firm* — Nath, Goldberg & Meyer; Jerald L. Meyer; Tanya E. Harkins

(57) ABSTRACT

A blade cart for a wind turbine blade for use during the manufacturing of such a blade is described. The cart presents an adjustable and adaptable support for the tip end of a blade after the blade is removed from the mold. The cart is rotatable, and comprises selectively actuatable and/or removable support surfaces to provided easy access to the surfaces of the molded blade for the performance of post-molding operations, e.g. blade surface grinding, coating, etc.

14 Claims, 3 Drawing Sheets

(51) Int. Cl.
  *B66C 1/10* (2006.01)
  *B65D 85/68* (2006.01)
  *F03D 1/00* (2006.01)

(56) References Cited

U.S. PATENT DOCUMENTS

| | | | | |
|---|---|---|---|---|
| 8,191,878 B2* | 6/2012 | Pedersen | ............... | B66C 1/108 269/55 |
| 8,313,272 B2* | 11/2012 | Koike | ............... | F03D 1/001 410/44 |
| 8,360,398 B2* | 1/2013 | Diaz De Corcuera | .. | B66C 1/108 254/131 |
| 8,366,360 B2* | 2/2013 | Krogh | ............... | B60P 3/40 410/44 |
| 8,550,522 B2* | 10/2013 | Echarri Latasa | ....... | B66C 1/108 29/889 |
| 8,672,131 B2* | 3/2014 | Nogueira | ............... | B65D 85/68 206/521 |
| 2005/0031431 A1* | 2/2005 | Wobben | ............... | B60P 3/40 410/45 |
| 2009/0020445 A1* | 1/2009 | Koike | ............... | F03D 1/001 206/319 |
| 2009/0169323 A1* | 7/2009 | Livingston | ............... | F03D 1/005 410/120 |
| 2011/0008147 A1* | 1/2011 | Lemos | ............... | F03D 1/005 414/800 |
| 2012/0032125 A1* | 2/2012 | Diaz De Corcuera | .. | B66C 1/108 254/131 |
| 2012/0043250 A1* | 2/2012 | Nogueira | ............... | B65D 85/68 206/521 |
| 2014/0193255 A1* | 7/2014 | Hancock | ............... | F03D 1/001 416/1 |
| 2014/0369779 A1* | 12/2014 | Randall | ............... | B60P 3/40 410/45 |
| 2015/0028608 A1* | 1/2015 | Wubbelmann | ......... | B66C 1/447 294/81.2 |

FOREIGN PATENT DOCUMENTS

| | | |
|---|---|---|
| EP | 2075467 A2 | 7/2009 |
| JP | 2010216317 A | 9/2010 |
| WO | 2009112887 A1 | 9/2009 |
| WO | 2009141018 A2 | 11/2009 |
| WO | 2010125424 A1 | 11/2010 |

* cited by examiner

BLADE CART FOR A WIND TURBINE BLADE

This is a National Phase Application filed under 35 U.S.C. 371 as a national stage of PCT/EP2012/075971, filed Dec. 18, 2012, and claims priority benefit from European Patent Application No. 1121760.1, filed Dec. 19, 2011, the content of each of which is hereby incorporated by reference in its entirety.

FIELD OF THE INVENTION

The present invention relates to a blade cart for a wind turbine blade for use during manufacturing of such a blade.

BACKGROUND OF THE INVENTION

Blade carts are known for use in the manufacturing process of wind turbine blades, the carts acting to support a section of the wind turbine blade towards the tip end of the blade, typically after the blade body has been molded and removed from the blade mold, and during post molding operations (e.g. external blade surface grinding or coating operations).

Current tip carts comprise an enclosed ring structure which is fitted around the body of the blade. However, as blade dimensions increase, such carts are often difficult to mount to the blade. A crane is usually needed to lift the blade tip up and down whilst the tip cart is moved (often manually) over the blade. In addition the tip cart presents an obstacle during post molding operations where people and equipment are hindered by the large ring, and prevented from easily accessing the blade leading and trailing edges at the location of the cart.

US Pat. No. 7,303,365 to Wobben discloses a support cart for a tip end of a wind turbine blade for use in long distance haulage operations. The illustrated cart is rotatable to allow for the passage of the supported blade beneath bridges and other overhanging obstacles. However, securing the blade within the cart of Wobben requires the use of bolting lugs for bolting the support cart to the blade body, and provides a mechanical coupling with the blade body such that that the cart is rotated when the root end of the blade is rotated. Such bolting lugs require additional manufacturing operations to install on the surface of the blade, and also must be subsequently removed from the blade before installation at a wind turbine to maximize aerodynamic efficiency. Furthermore, such a rigid coupling is not suitable for use with a pre-bent blade, wherein the wind turbine blade has a curved structure along the longitudinal length of the blade. Accordingly, the cart of Wobben is not suitable for use during the manufacturing process, in particular during post molding operations for a blade.

It is an object of the invention to provide a blade cart for a wind turbine blade for use during manufacturing of such a blade.

SUMMARY OF THE INVENTION

Accordingly, there is provided a blade cart for a wind turbine blade for use during manufacturing of such a blade, in particular for use during post molding operations, the blade cart comprising:

a rotatable frame to receive a portion of a molded wind turbine blade;

a first support provided in said frame having a support surface to receive a pressure side of a wind turbine blade;

a second support provided in said frame having a support surface to receive a suction side of a wind turbine blade; and a leading edge support provided in said frame having a support surface to receive a leading edge of a wind turbine blade, wherein said first support and said second support are pivotably coupled to said frame, such that said first support and said second support are rotatable about at least one axis to present an adjustable support surface for a molded wind turbine blade received in said blade cart, and wherein said leading edge support is moveable relative to said frame.

The use of adjustable support surfaces means that a variety of different blade types may be received within the blade cart, which may be varied in terms of pre-bending, twist, etc. Furthermore, the support arms can be adjusted so that the cart is not limited for use at a particular point along the length of the blade.

Preferably, at least one of said first support and said second support are selectively actuatable to engage with a surface of a wind turbine blade, preferably linearly actuatable from a first withdrawn position where the support is located away from a wind turbine blade received within said frame to a second advanced position where the support bears against a surface of a wind turbine blade received within said frame.

The selective actuation of the supports allows for access to be provided to the surface of the molded wind turbine blade held within the cart, e.g. for the purpose of performing post-molding operations on the blade surface.

Preferably, the cart comprises a leading edge support provided in said frame having a support surface to receive a leading edge of a wind turbine blade.

Providing a separate leading edge support allows for the blade to be supported during a rotation of the frame and the contained blade.

Preferably, said leading edge support is removable from said frame, to provide access to the leading edge of a wind turbine blade received in said frame.

This allows for access to be provided to the leading edge surface of the molded wind turbine blade, e.g. for a leading edge grinding operation.

Additionally or alternatively, said leading edge support is selectively actuatable, preferably linearly actuatable, from a withdrawn position away from the surface of a blade received within said frame to an advanced position wherein the leading edge support bears against the leading edge surface of a blade received within said frame.

Preferably, said leading edge support is pivotably coupled to said frame, such that said leading edge support is rotatable about at least one axis to present an adjustable leading edge support surface for a molded wind turbine blade received in said blade cart.

Preferably, said first support and said second support are rotatable about the horizontal axis. Further preferably, said first support and said second support are rotatable about the vertical axis. Further preferably, said first support and said second support are pitchable about the normal axis.

As the supports preferably can be moveable about three separate axes, the supports can be arranged to receive curved wind turbine blades. Providing supports which are pitchably tiltable on the frame allows for the blade cart to accommodate wind turbine blades having a bend or curve, e.g. pre-bent or swept blades.

Preferably, said leading edge support is independently moveable relative to said first and second supports.

Preferably, said leading edge support is rotatable about the horizontal axis. Further preferably, said leading edge support is rotatable about the vertical axis. Further preferably, said leading edge support is pitchable about the normal axis.

Preferably, said leading edge support is provided on a base plate, wherein said base plate is flexibly mounted to said frame.

Preferably, a plurality of spring members or cushioning members are provided between said base plate and said frame.

The use of the spring members at the base plate of the leading edge support allows the spring members or a cushioning member, e.g. a rubber plate or buffer, to absorb shock loads when said leading edge support receives a wind turbine blade, and wherein the leading edge support can dynamically adjust the angle of support when receiving a wind turbine blade.

Preferably, said frame is provided on a wheeled base. Preferably said base comprises a plurality of trolley wheels operable to wheel said cart in any direction.

Preferably, said cart comprises a plurality of rollers mounted on said base, said frame mounted on said rollers and operable to be rotated in said rollers.

Preferably, said frame comprises a substantially C-shaped structure, wherein a wind turbine blade may enter said frame through the open end or mouth of said C-shaped structure.

Preferably, at least one of said first support and said second support and/or said leading edge support comprises a substantially cushioned surface. Preferably, the blade cart thriller comprises at least one inflatable cushion member.

Preferably, at least one of said first support and said second support and/or said leading edge support are replaceable. Preferably, at least one of said first support and said second support and/or said leading edge support are selectable dependent on the characteristics of a blade to be received by said cart.

There is also provided a method of receiving a wind turbine blade within said blade cart having an frame with a opening, the method comprising the steps of:

rotating said frame such that the opening of said frame, preferably the open end or mouth of a C-shaped structure, faces the leading edge of a wind turbine blade, moving said cart relative to said blade to position the frame about the wind turbine blade, such that wind turbine blade enters the interior of said frame through the opening of said frame, preferably through the open end or mouth of said C-shaped structure, and actuating at least one of said supports such that said blade is supported, preferably retained, within said frame.

DESCRIPTION OF THE INVENTION

An embodiment of the invention will now be described, by way of example only, with reference to the accompanying drawings.

Figure 1:
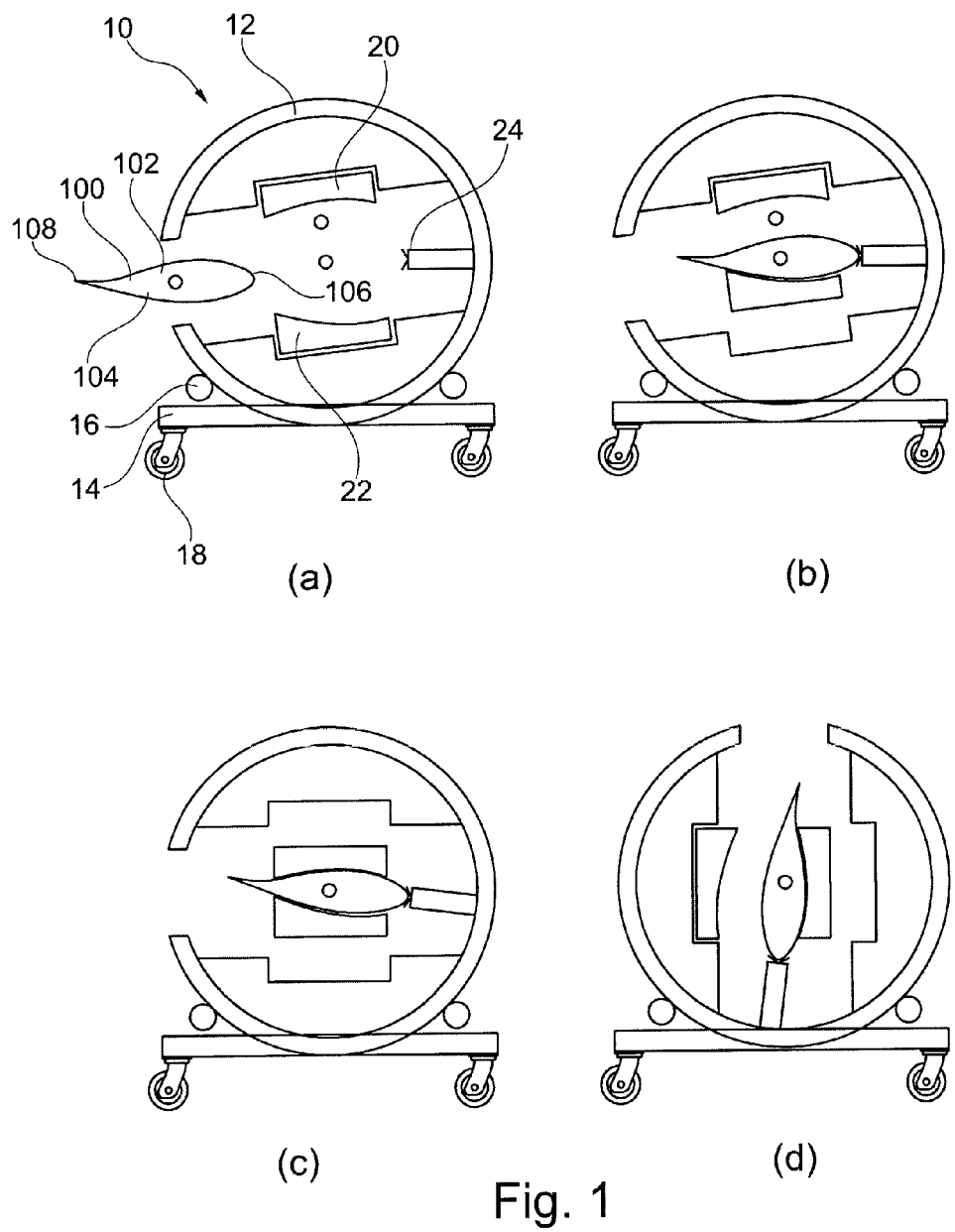
FIG. 1(a)-(d) show a series of drawings of a blade cart when receiving a blade within the cart according to an embodiment, where 1(a) shows the cart arranged to receive a wind turbine blade, 1(b) shows the wind turbine blade supported within the cart, 1(c) shows the wind turbine blade more securely retained within the cart, and 1(d) shows the frame rotated approximately 90 degrees relative to the position in FIGS. 1(a)-(c).

FIG. 1 shows a series of drawings of a blade cart 10 according to the invention when receiving a blade 100 within the cart. For clarity purposes, reference numerals are only shown in FIG. 1(a).

With reference to FIG. 1(a), the cart 10 comprises a substantially C-shaped frame 12 supported on a base 14 via a plurality of rollers 16, the frame 12 operable to be rotated on said rollers 16. In an alternate embodiment, the frame 12 may be rotated using a chain and pulley system (not shown). The base 14 is supported on a plurality of wheels 18, preferably unidirectional trolley wheels, which allow for the movement of the cart in any direction within the workspace.

The cart 10 comprises a first support 20 and a second support 22 provided within the frame 12, the first support 20 arranged to have a surface to receive a portion of a pressure side surface 102 of a wind turbine blade 100, the second support 22 arranged to have a surface to receive a portion of a suction side surface 104 of a wind turbine blade 100. The supports 20,22 are selectively actuatable to advance and retract within said frame 12.

The cart 10 further comprises a leading edge support 24 provided within the frame 12, the leading edge support 24 arranged to have a surface to receive a portion of a leading edge surface 106 of a wind turbine blade 100.

In use, the cart 10 is arranged such that the open end of the C-shaped frame 12 is rotated to face in the direction of the leading edge 106 of a wind turbine blade 100 to be received within the frame 12, FIG. 1(a). The cart 10 can then be moved on wheels 18 such that the frame 12 is positioned around the blade 100.

The cart 10 is moved such that the leading edge 106 of the blade 100 is received by the leading edge support 24, FIG. 1(b). At this point, the second support 22 is advanced within the frame 12 such that the surface of the second support 22 abuts a portion of the suction side surface 104 of the blade 100. The blade 100 is now resting on the second support 22. In FIG. 1(c), the first support 20 is advanced to bear against a portion of a pressure side surface 102 of the wind turbine blade 100, such that the blade 100 is retained within the frame 12, effectively held in position by the bearing surfaces of the first and second supports 20,22. At this point the frame 12 may be rotated to hold the blade 100 in a more convenient orientation for post-molding operations.

It will be understood that the above-described procedure may be performed in a different order, dependent on the orientation of the wind turbine blade 100 before supporting by the cart 10, e.g. if the wind turbine blade is provided in an orientation 180 degrees to that shown in FIG. 1, i.e. wherein the suction side 104 of the blade faces in an upwards direction, the cart 10 may be positioned about the blade 10 by moving the frame such that the blade leading edge 106 enters through the open end of the C-shaped frame 12, and wherein the first support 20 is initially advanced to bear against a portion of the pressure side surface 102 of the blade 100 to provide a simple support of the blade 100, followed by the advancing of the second support 22 to secure the blade 100 within the cart 10.

It will be understood that once the blade 100 is supported within the frame 12, any external support means, e.g. a harness, a crane, etc., for the blade 100 may be removed. This may be performed once the blade 100 is simply supported within the cart 10, e.g. in FIG. 1(b) after the second support 22 is advanced to bear against the suction side of the blade 100, or after the blade is more securely retained within the cart 10, e.g. in FIG. 1 (c) after the first support 20 is advanced to secure the pressure side surface of the blade 100.

As the molded blade 100 is being worked on, e.g. during surface grinding or coating operations, the frame 12 may be rotated, thereby rotating the contained blade 100, to provide easier access to the surfaces of the blade 100. Furthermore, the individual supports 20, 22, 24 of the cart 10 may be selectively removable such that access may be provided to the surfaces of the blade 100 resting on the supports 20, 22, 24. In FIG. 1(*d*), the frame 12 is rotated approximately 90 degrees relative to FIGS. 1(*a*)-(*c*), such that the blade 100 is largely supported at the leading edge 106 of the blade on the leading edge support 24. At this point, the second support 22 may be retracted to the withdrawn position, thereby providing access to the suction side surface 104 of the blade 100 at the cart. While the first support 20 is still applied against the pressure side surface 102 of the blade 100 at this stage, to provide a resting support for the blade 100, similarly the first support 20 may be retracted to provide access to the pressure side surface 102 of the blade 100 at the cart 10 when the second support 22 is advanced against the blade 100 surface.

Furthermore, the leading edge support 24 of the cart 10 may be selectively actuatable to a retracted position, and/or the support 24 may be removable from the cart 10 when the blade is in a substantially horizontal alignment, e.g. as in FIGS. 1(*a*)-(*c*), to provide access to the leading edge 106 of the blade 100. Also, due to the cart 10 construction, the blade trailing edge 108 is unobstructed and may be easily accessible at any time.

Accordingly, a worker performing a surface treatment operation on the surfaces of the blade 100 in the vicinity of the cart 10 is not restricted by the presence of the cart 10.

Figure 2:
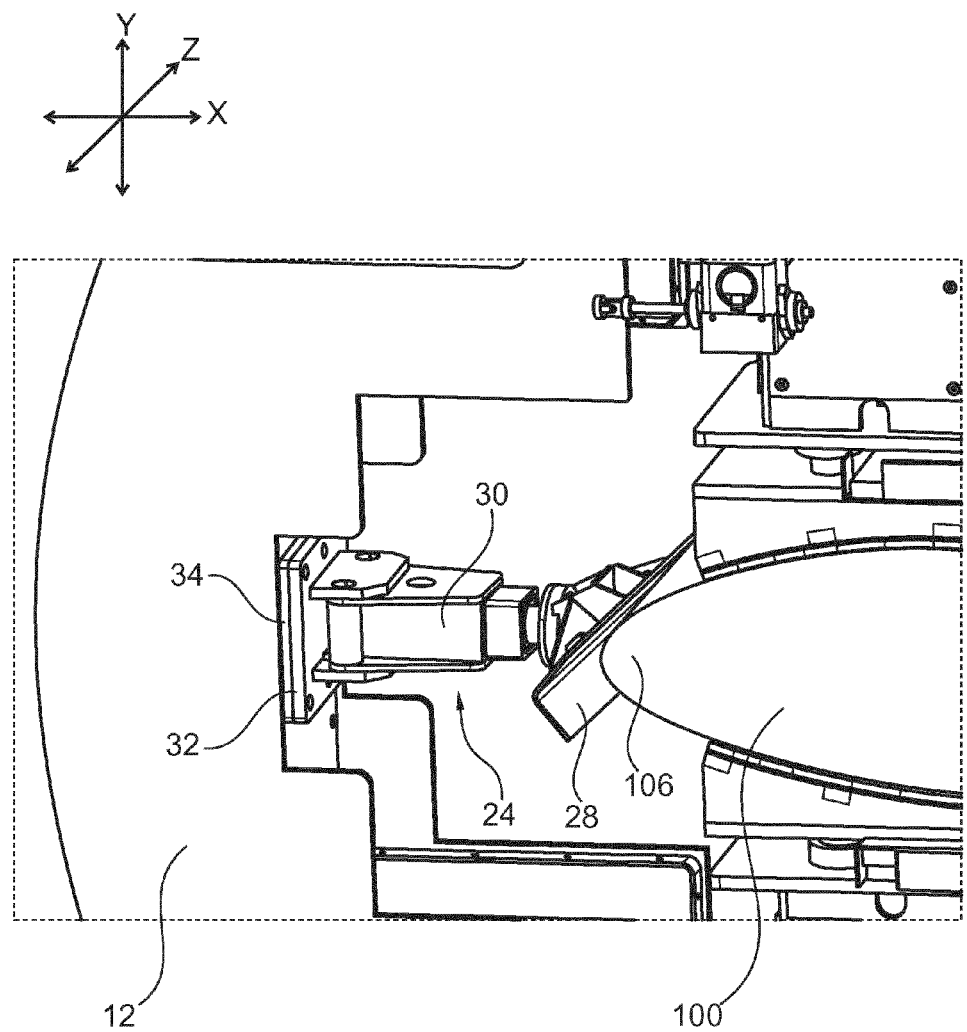
FIG. 2 shows an enlarged view of a leading edge support of an embodiment.

FIG. 2 shows an enlarged view of a leading edge support 26 of an embodiment of the invention. The leading edge support 26 comprises a bracket 28 provided on an arm 30, the arm mounted to the frame 12. The bracket 28 is shaped to receive a portion of the leading edge 106 of the wind turbine blade 100.

The arm 30 is preferably mounted to the frame 12 via base plate 32. In a preferred aspect, cushioning means in the form of a plurality of springs or a rubber cushioning plate 34 are provided between the base plate 32 and the frame 12.

Preferably, the bracket 28 is arranged to rotate with respect to the arm 30, preferably around the longitudinal axis of the arm 30, e.g. around the X-axis at the support 26. This allows the bracket 28 to swivel to receive the leading edge 106 of the blade 100, in the case that the blade 100 is a pre-bent blade, having a curve along the longitudinal direction of the blade.

Further preferably, the bracket 28 is arranged to rotate around a portion of the Y-axis at the point of connection to the arm 30, such that the bracket 28 may receive the leading edge 106 of a swept wind turbine blade.

Further preferably, the bracket 28 is arranged to rotate around a portion of the Z-axis at the point of connection to the arm 30, such that the bracket 28 may receive the leading edge 106 of a blade 100 having a non-standard camber at the leading edge.

The use of a cushioning means 34 between the arm 30 and the frame 12 allows for the absorption of any shock loads experienced when a blade leading edge 106 of a blade 100 is received in the bracket 28. Furthermore, the flexible nature of the cushioning means 34 allows for the connected arm 30 and bracket 28 to dynamically deflect to an appropriate angle for the support of the blade leading edge 106.

It will be understood that the bracket 28 may be easily removable from the arm 30, such that different profile brackets may be used in the cart 10 to provide effective support for different blades having different leading edge profiles. Furthermore, it will be understood that the bracket 28 and/or the arm 30 may be moveable relative to the frame 12 to provide access to a blade leading edge 106.

Figure 3:
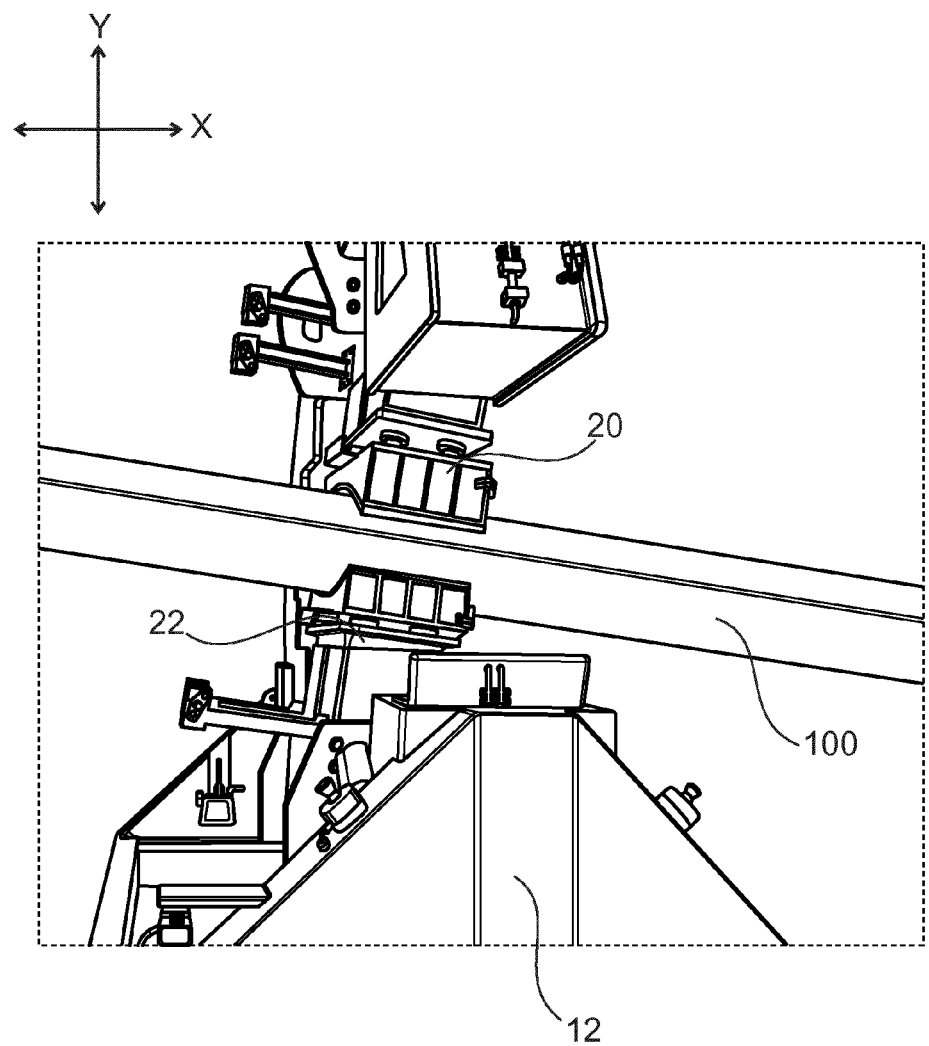
FIG. 3 shows an enlarged view of an embodiment where a portion of a blade cart when supporting a portion of a wind turbine blade.

FIG. 3 shows an image of a portion of a blade cart 10 according to the invention when supporting a portion of a wind turbine blade 100. The first and second supports 20,22 are arranged to be rotatable at least about a portion of the X- and/or Y-axes indicated, and/or the Z-axis (substantially normal to the page), such that the supports 20,22 may be pivotable to accommodate a pre-bent wind turbine blade 100, a swept wind turbine blade 100, and/or wind turbine blades having different aerodynamic profiles. The supports 20,22 may be replaceable such that different supports can be selectable based on which support surface provides better support for the different aerodynamic shape of a blade to be supported. In FIG. 3, the supports 20,22 are shown as adjusted to receive a portion of a pre-bent blade 100.

Preferably, at least one of the supports 20,22,24 are cushioned to present a yieldable support surface for the wind turbine blade 100, which does not damage the supported blade surface, nor require any complicated coupling operations to secure to the blade. In preferred embodiments, the supports 20,22,24 comprise inflatable support cushions.

Preferably, the cart 10 is synchronised with a root end support device for a blade (not shown), such that the root end support and the blade cart frame are coordinated to rotate at the same time.

Some of the advantages provided by the blade cart of the present invention include:

1. ) During post molding operations, workers do not have to work under a suspended load or adjust any of the systems on the cart by climbing on or sitting under the blade in an uncomfortable position.
2. ) The blade can be loaded without having to vertically lift the root using a crane and position a tip cart around the tip. The pre-bend is so large on this blade that it is not safe to load it any other way. It is drop and drive.
3. ) Access to blade leading edge is provided by removing/withdrawing the leading edge support. Furthermore, access to the trailing edge can be provided through the open C-ring design.
4. ) Root and tip cart are synchronized to avoid torsion forces in the blade.
5. ) The tip support blocks turn around a separate hinge point to accommodate a flexible and pre-bended blade.
6. ) Clamping devices or supports are blade specific. Due to the blade weight this is necessary to distribute the forces evenly over the surface. The clamping blocks or supports can be removed to accommodate other blade types.

The invention is not limited to the embodiment described herein, and may be modified or adapted without departing from the scope of the present invention.

The invention claimed is:

1. A blade cart for a wind turbine blade for use during manufacturing of such a blade, in particular for use during post molding operations, the blade cart comprising:
    a rotatable frame to receive a portion of a molded wind turbine blade;
    a first support provided in said frame having a support surface to receive a pressure side of the wind turbine blade;
    a second support provided in said frame having a support surface to receive a suction side of the wind turbine blade; and
    a leading edge support provided in said frame having a support surface to receive a leading edge of the wind turbine blade, wherein said first support and said second support are pivotably coupled to said frame, such that said first support and said second support are rotatable about at least one axis to present an adjustable support surface for the molded wind turbine blade received in said blade cart, and wherein said leading edge support is moveable relative to said frame, wherein said frame comprises a substantially C-shaped structure, wherein a wind turbine blade may enter said frame through the open end or mouth of said C-shaped structure.

2. The blade cart of claim 1, wherein at least one of said first support and said second support are selectively actuatable to engage with a surface of the wind turbine blade, preferably linearly actuatable, from a first withdrawn position where the support is located away from the wind turbine blade received within said frame to a second advanced position where the support bears against the surface of the wind turbine blade received within said frame.

3. The blade cart of claim 1, wherein said leading edge support is removable from said frame, to provide access to the leading edge of the wind turbine blade received in said frame.

4. The blade cart of claim 1, wherein said leading edge support is selectively actuatable, preferably linearly actuatable, from a withdrawn position away from the surface of the blade received within said frame to an advanced position wherein the leading edge support bears against a leading edge surface of the blade received within said frame.

5. The blade cart of claim 1, wherein said leading edge support is pivotably coupled to said frame, such that said leading edge support is rotatable about at least one axis to present an adjustable leading edge support surface for the molded wind turbine blade received in said blade cart.

6. The blade cart of claim 1, wherein said first support and said second support are rotatable about at least one of the following: the horizontal axis, the vertical axis, and/or the normal axis.

7. The blade cart of claim 1, wherein said leading edge support is independently moveable relative to said first and second supports.

8. The blade cart of claim 1, wherein said leading edge support is rotatable about at least one of the following: the horizontal axis, the vertical axis, and/or the normal axis.

9. The blade cart of claim 1, wherein said leading edge support is provided on a base plate, wherein said base plate is flexibly mounted to said frame.

10. The blade cart of claim 9, wherein resilient cushioning means, a spring means or a rubber plate, are provided between said base plate and said frame.

11. The blade cart of claim 1, wherein said cart comprises a plurality of rollers mounted on a base, said frame mounted on said rollers and operable to be rotated in said rollers.

12. The blade cart of claim 1, wherein at least one of said first support, said second support, and/or said leading edge support are replaceable.

13. The blade cart of claim 1, wherein at least one of said first support and said second support and/or said leading edge support comprises a substantially cushioned surface.

14. A method of receiving a wind turbine blade within a blade cart having a frame with an opening, the method comprising the steps of:

rotating said frame having a substantially C-shaped structure, such that an open end or mouth of said C-shaped structure faces a leading edge of said wind turbine blade, moving said cart relative to said wind turbine blade to position the frame about the wind turbine blade, such that said wind turbine blade enters the interior of said frame through the open end or mouth of said C-shaped structure, and actuating at least one support such that said wind turbine blade is supported, preferably retained, within said frame.

* * * * *